(12) United States Patent
Kondas

(10) Patent No.: US 9,755,385 B1
(45) Date of Patent: Sep. 5, 2017

(54) ELECTRICAL RECEPTACLE ASSEMBLY

(71) Applicant: Group Dekko, Inc., Garrett, IN (US)

(72) Inventor: Shawn J. Kondas, Kendallville, IN (US)

(73) Assignee: Group Dekko, Inc., Garrett, IN (US)

( * ) Notice: Subject to any disclaimer, the term of this patent is extended or adjusted under 35 U.S.C. 154(b) by 0 days.

(21) Appl. No.: 15/138,866

(22) Filed: Apr. 26, 2016

(51) Int. Cl.
| H01R 13/66 | (2006.01) |
| H01R 27/00 | (2006.01) |
| H01R 24/78 | (2011.01) |
| H01R 13/502 | (2006.01) |
| H01R 13/74 | (2006.01) |
| H01R 43/20 | (2006.01) |
| H01R 24/60 | (2011.01) |
| H01R 103/00 | (2006.01) |
| H01R 107/00 | (2006.01) |

(52) U.S. Cl.
CPC .......... *H01R 27/00* (2013.01); *H01R 13/502* (2013.01); *H01R 13/74* (2013.01); *H01R 24/60* (2013.01); *H01R 24/78* (2013.01); *H01R 43/20* (2013.01); *H01R 2103/00* (2013.01); *H01R 2107/00* (2013.01)

(58) Field of Classification Search
CPC ...... H01R 27/00; H01R 13/502; H01R 13/74; H01R 24/60; H01R 24/78; H01R 43/20; H01R 2103/00; H01R 2107/00

USPC .................................................. 439/535–545
See application file for complete search history.

(56) References Cited

U.S. PATENT DOCUMENTS

| 3,928,716 | A | * | 12/1975 | Marrero | ................. | H02G 3/125 |
| | | | | | | 174/57 |
| 5,516,298 | A | * | 5/1996 | Smith | ................... | A47B 21/06 |
| | | | | | | 439/131 |
| 6,024,600 | A | * | 2/2000 | Daoud | ................... | F16B 35/041 |
| | | | | | | 174/51 |
| 7,759,576 | B1 | * | 7/2010 | Gretz | ................... | H02G 3/123 |
| | | | | | | 174/480 |
| 7,816,604 | B1 | * | 10/2010 | Gretz | ................... | H01R 25/006 |
| | | | | | | 174/135 |

\* cited by examiner

*Primary Examiner* — Khiem Nguyen
(74) *Attorney, Agent, or Firm* — Taylor IP, P.C.

(57) ABSTRACT

An electrical receptacle assembly, comprising a housing including a back, a plurality of sides, and a front opening; a face plate attached to the housing; a support flange attached to the housing; at least one electrical outlet attached to one of the plurality of sides; a connection member attached to the back, the connection member including a plurality of openings; and a securing member for releasable engagement with the connection member, the securing member including an engagement tab and an opening for a fastener The electrical receptacle assembly can be secured to a supporting surface in an open position by a combination of fasteners and the securing member.

20 Claims, 5 Drawing Sheets

ELECTRICAL RECEPTACLE ASSEMBLY

BACKGROUND OF THE INVENTION

1. Field of the Invention

The present invention relates to electrical power receptacles, and, more particularly, to electrical receptacle assemblies with multiple outlet possibilities.

2. Description of the Related Art

In many applications, electrical receptacles are needed to receive and distribute power. They are required in permanent locations such as walls in fixed structures, as well as temporary locations such as modular office furniture. Many types of receptacles are required according to the needs of users. Some receptacles, for example, include distribution of power for computers, telephones, and corded appliance, etc. The electrical receptacles also are required in places that are convenient for the user, and may need to be re-located.

It is known in the art to have electrical receptacles that are attached to supporting surfaces via fasteners, typically screws. It is also known in the art to permanently attach electrical receptacles to supporting surfaces. It is further known in the art to require access to the electrical outlets of electrical receptacles at times, and also to not have access to the electrical outlets at other times.

Depending upon the types of electrical receptacles and the applications in which they are used, various problems can be encountered. One problem is with the varying thicknesses of supporting surfaces for the receptacles that may be encountered. Multiple mounting arrangements may then be required in those circumstances.

Another problem that can be encountered is that the electrical outlets of receptacles may be intentionally or unintentionally displaced from an exposed state to an unexposed state.

A further problem that can be encountered is the inability to easily install the electrical receptacle and remove it at a later time, and further to use the same receptacle in a different location.

What is needed in the art is an electrical power receptacle that can be used on varying thicknesses of supporting surfaces.

SUMMARY OF THE INVENTION

The present invention is directed to an electrical power receptacle assembly with features that allow it to be secured in an open position in a variety of supporting surface thicknesses.

The present invention provides an electrical power receptacle assembly for providing a power outlet to desirable locations, insertable into openings in support surfaces of varying thicknesses.

The present invention further provides an electrical power receptacle assembly variably configured with electrical outlets.

The present invention further provides an electrical power receptacle assembly with a securing member to keep the electrical outlets exposed above the supporting surface.

An advantage of the present invention is that one electrical power receptacle assembly can be used in supporting surface of varying thicknesses.

Another advantage of the present invention is that the electrical power receptacle assembly can utilize its geometry to accommodate small changes in supporting surface thicknesses.

Still another advantage of the present invention is that the electrical power receptacle assembly can be configured with a variety of electrical outlets.

Yet another advantage of the present invention is that the electrical power receptacle assembly can be used in any supporting surface including walls, tables, ceilings, floors, raceways, columns, posts, etc.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
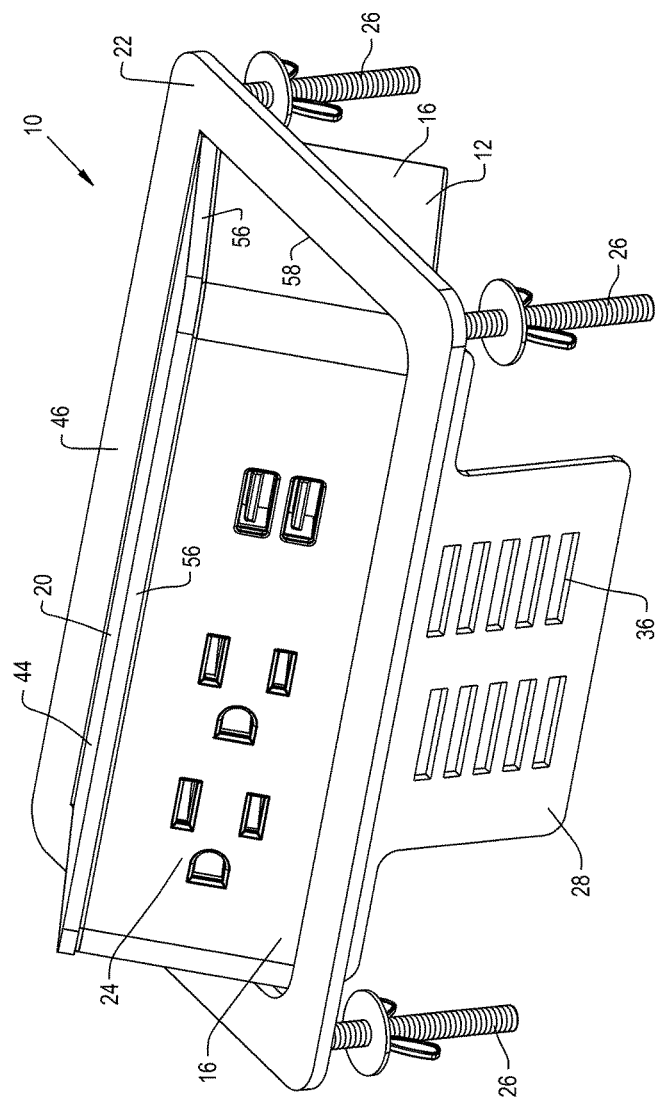
FIG. 1 is a top front perspective view of an embodiment of an electrical receptacle assembly of the present invention.
Figure 2:
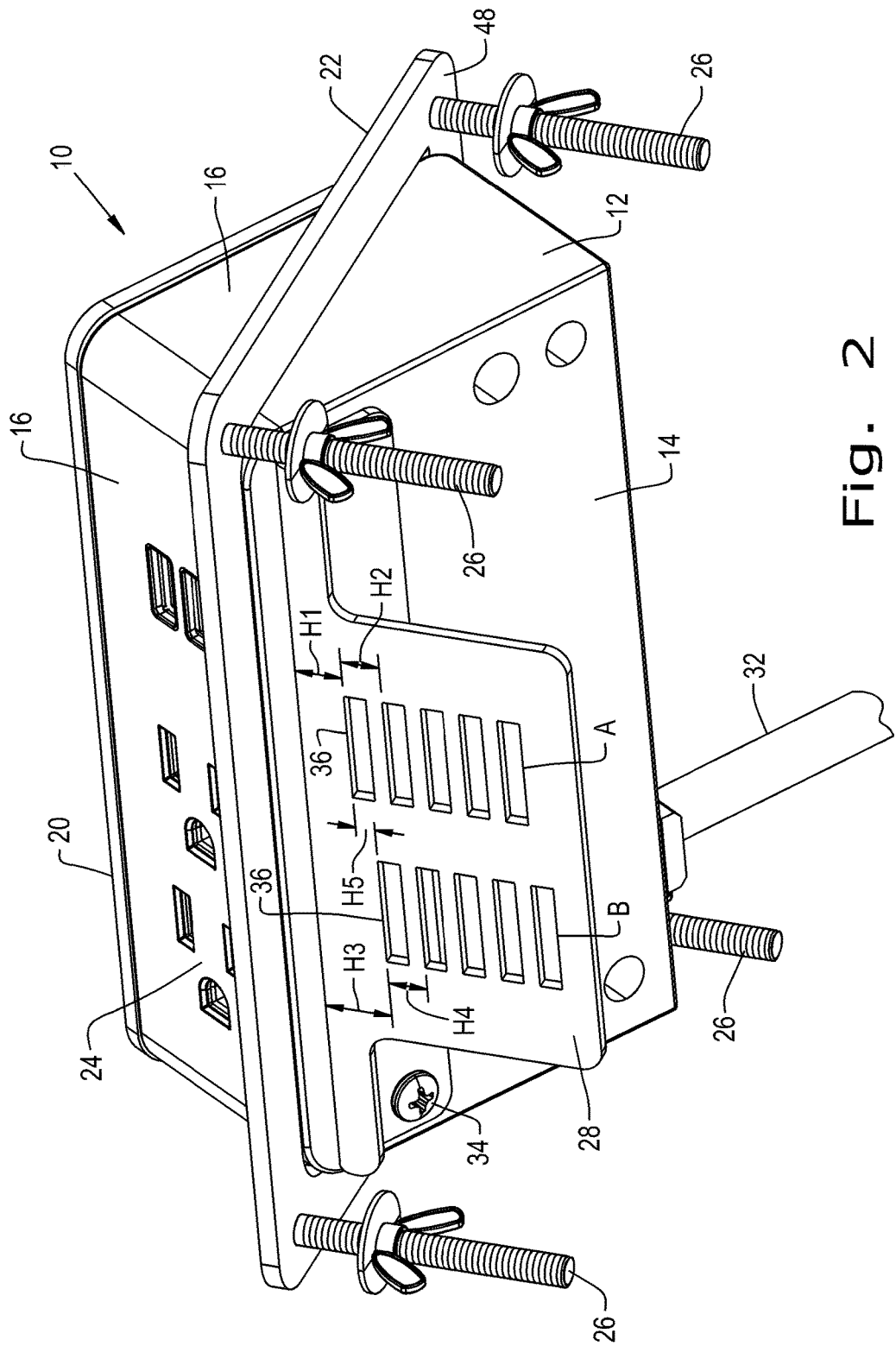
FIG. 2 is a bottom front perspective view of the embodiment of FIG. 1.

Referring now to FIGS. 1-2, there is shown an embodiment of an electrical receptacle assembly 10 according to the present invention. Electrical receptacle assembly 10 includes housing 12, support flange 22, support flange fasteners 26, securing member 30, and securing member fastener 42.

Housing 12 of electrical receptacle assembly 10 includes a back 14, a plurality of sides 16, a front opening 18 (not illustrated), and a face plate 20. Housing 12 further includes at least one electrical power input cord or wire 32 on at least one of the plurality of sides 16. The at least one electrical power input cord or wire 32 can be on any of the at least one of the plurality of sides 16; FIG. 2 illustrates one possible configuration.

Face plate 20 includes a top surface 44 and a plurality of sides 56. Face plate 20 and housing 12 can be manufactured as a single unit, or face plate 20 can be attached to housing 12 with a plurality of fasteners, or by any other way known in the art.

At least one of the plurality of sides 16 of housing 12 includes at least one electrical outlet 24. The at least one electrical outlet 24 can be any type of electrical input port; although Universal Serial Bus (USB) outlets and alternating current (AC) outlets are shown, any other electrical outlet 24 may be included. Additionally, At least one of the plurality of sides 16 may include one type of electrical outlet 24 or a mixture of different types.

Figure 5:
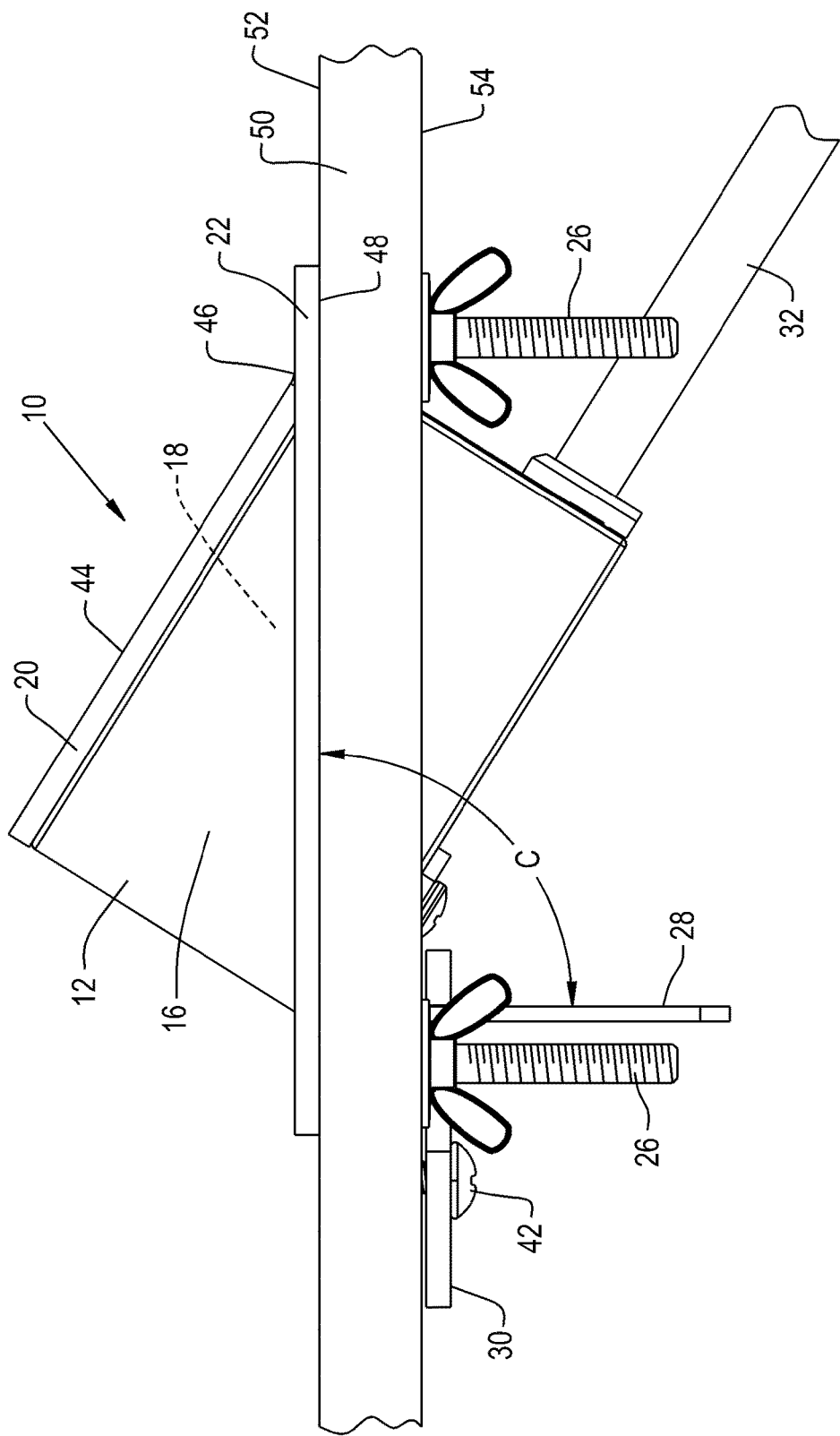
FIG. 5 is a side view the embodiment of FIG. 1 mounted to a supporting surface.

Housing 12 further includes a connection member 28. Connection member 28 is attached to the back 14 of housing 12. It can be manufactured as part of housing 12 (a one-piece configuration), or it can be removably attached to housing 12 via connection member fasteners 34 shown in FIG. 2, or by any other way known in the art. Connection member 28 is at an angle C in relationship to support flange 22 as shown in FIG. 5, the purpose for which is described further in this specification.

Connection member 28 includes a plurality of openings 36. Openings 36 can be of any configuration; as shown in FIGS. 1-5, they are in the configuration of elongated slots. Openings 36 are arranged in at least one column A on connection member 28. In the Figures shown, there are two columns A and B; however, any number of columns may be used.

Openings 36 are arranged at regular intervals (equidistant to each other) in the at least one column. As seen in FIG. 2, the first opening 36 in column A is at a height H1 from the back 14 of housing 12. The next opening 36 is at a height H2 from the first opening 36, and all subsequent openings 36 in column A are located in the same manner.

Similarly, first opening 36 in column B is at a height H3 from the back 14 of housing 12. The next opening 36 is at a height H4 from the first opening 36, and all subsequent openings 36 in column B are located in the same manner.

Advantageously, height H3 is greater than height H1, thereby creating a height H5 between the tops of columns A and B. Height H5 is less than height H2, which allows a finer adjustment to allow for smaller variances in the thickness of supporting surface 50, explained below.

Support flange 22 includes top surface 46, bottom surface 48, and inside surface 58. Support flange 22 further includes a plurality of support flange fasteners 26, which may be manufactured as part of support flange 22 (a one-piece configuration), or which can be removably attached to support flange 22. Support flange 22 is hingedly attached to housing 12.

Figure 3:
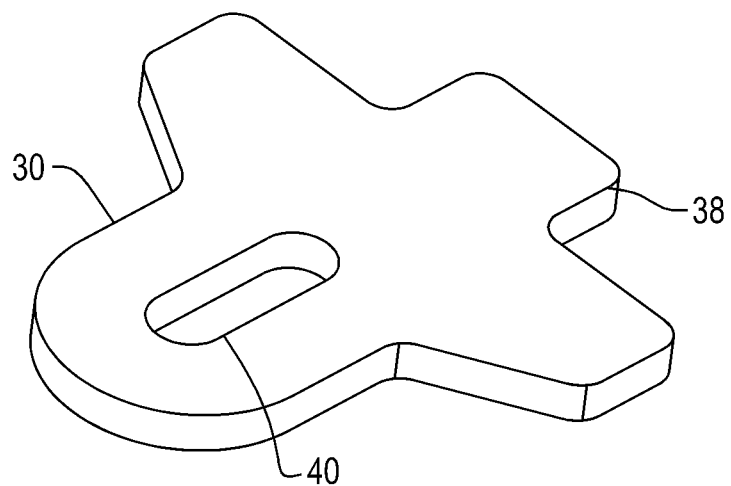
FIG. 3 is a top view of the securing member in the embodiment of FIG. 1.

Now referring to FIG. 3 with continued reference to FIG. 1, securing member 30 is described. Securing member 30 includes opening 36 and engagement tab 38. Opening 36 may be any configuration; in FIG. 3, opening 36 is shown as an elongated slot. The geometry of engagement tab 38 allows it to be inserted into any of the plurality of openings 36 of connection member 28.

Figure 4:
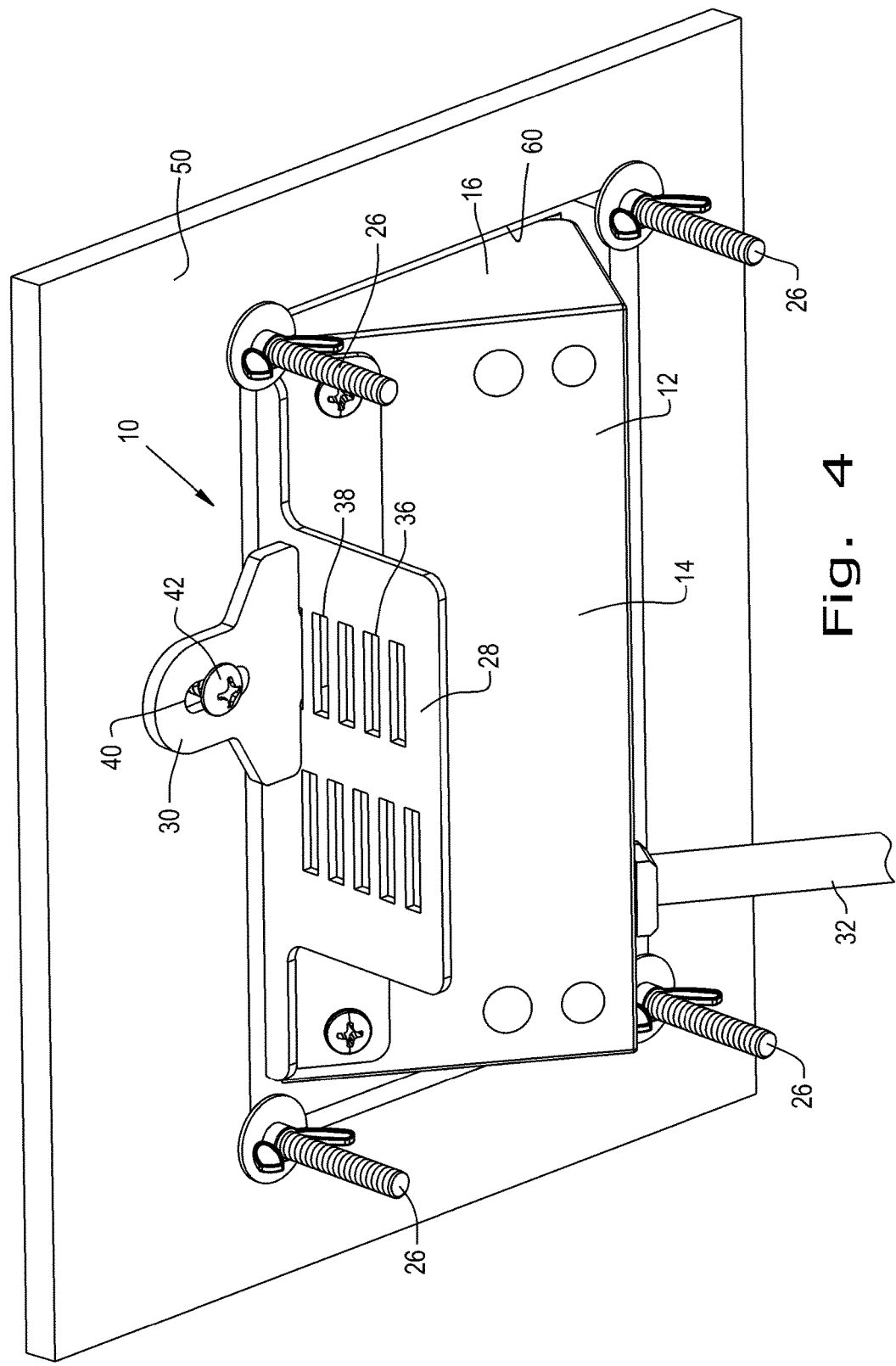
FIG. 4 is a bottom front perspective view the embodiment of FIG. 1 mounted to a supporting surface.

Now referring to FIGS. 4-5 with continued reference to FIGS. 1-3, a method of installing the electrical receptacle assembly 10 in a supporting surface 50 is described hereby. Supporting surface 50 can be any surface such as a wall, a table, a ceiling, a floor, a raceway, a column, a post, or any other surface where an electrical receptacle is desired in a permanent or temporary location. Supporting surface 50 includes top surface 52, bottom surface 54, and opening 60.

To install electrical receptacle assembly 10 in the supporting surface 50, the housing 12, electrical power input cord or wire 32, and support flange 22 are inserted into opening 60 of supporting surface 50 until the bottom surface 48 of support flange 22 is proximate the top surface 52 of the supporting surface 50. Support flange fasteners 26 are then used to secure housing 12 and support flange 22 to supporting surface 50.

At this stage, housing 12 may be in a first closed position (not shown) or in a second open position, as shown in FIGS. 4-5. In the first closed position, top surface 44 is flush with top surface 46 of support flange 22, and housing 12 with attached face plate 20 fit within the inside surface 58 of support flange 22.

When housing 12 is in the second open position, connection member 28, by virtue of angle C as described above, is in a vertical position perpendicular to supporting surface 50. The engagement tab 38 of securing member 30 is then inserted into the first fully exposed opening of the plurality of openings 36 in connection member 28 that is closest to the bottom surface 54 of supporting surface 50. Securing member 30 is then attached with fastener 42 through opening 40 to the bottom surface 54 of support surface 50, thereby preventing housing 12 from displacing to a first closed position.

While electrical receptacle assemblies have been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical receptacle assembly, comprising:
    a housing including a back, a plurality of sides, and a front opening;
    a face plate attached to the housing;
    a support flange attached to the housing;
    at least one electrical outlet attached to one of the plurality of sides; and
    a connection member attached to the back, the connection member including a plurality of openings; and
    a securing member for releasable engagement with the connection member, the securing member including an engagement tab and an opening for a fastener, wherein the engagement tab of the securing member couples with one of said plurality of openings of said connection member.

2. The electrical receptacle assembly of claim 1, wherein the support flange includes at least one fastener.

3. The electrical receptacle assembly of claim 1, wherein the electrical receptacle assembly further comprises at least one cord or wire for power input.

4. The electrical receptacle assembly of claim 1, wherein the housing is pivotally attached to the support flange.

5. The electrical receptacle assembly of claim 4, wherein the housing is capable of being secured in a first closed position and a second open position.

6. The electrical receptacle assembly of claim 5, wherein the face plate is flush with a top surface of the support flange when the housing is in the first closed position.

7. The electrical receptacle assembly of claim 1, wherein the plurality of openings are elongated slots.

8. The electrical receptacle assembly of claim 7, wherein the plurality of openings are in at least one column.

9. The electrical receptacle assembly of claim 8, wherein the plurality of openings are in two columns.

10. The electrical receptacle assembly of claim 1, wherein the opening is an elongated slot.

11. The electrical receptacle assembly of claim 1, wherein the at least one electrical outlet is a Universal Serial Bus (USB) port.

12. The electrical receptacle assembly of claim 1, wherein the at least one electrical outlet is an alternating current (AC) port.

13. The electrical receptacle assembly of claim 1, wherein the connection member is removably attached to the back plate.

14. The electrical receptacle assembly of claim 1, wherein the face plate is removably attached to the housing.

15. A method of securing an electrical receptacle in an open position on a supporting surface, comprising:
    providing an electrical receptacle assembly including:

a housing including a back, a plurality of sides, and a front opening;
a face plate attached to the housing;
a support flange attached to the housing;
at least one electrical outlet attached to one of the plurality of sides;
a connection member attached to the back, the connection member including a plurality of openings; and
a securing member for releasable engagement with the connection member, the securing member including an engagement tab and an opening for a fastener;

inserting the electrical receptacle assembly in an opening of the supporting surface;
attaching the support flange to the supporting surface;
tilting the housing away from the supporting surface;
coupling the securing member to the connection member; and
attaching the securing member to the supporting surface.

16. The method of claim 15, wherein the at least one electrical outlet is a Universal Serial Bus (USB) port.

17. The method of claim 15, wherein the at least one electrical outlet is an alternating current (AC) port.

18. The method of claim 15, wherein the housing is pivotally attached to the support flange.

19. The method of claim 18, wherein the housing is capable of being secured in a first closed position and a second open position.

20. The method of claim 19, wherein the face plate is flush with a top surface of the support flange when the housing is in the first closed position.

\* \* \* \* \*